Patented Dec. 7, 1948

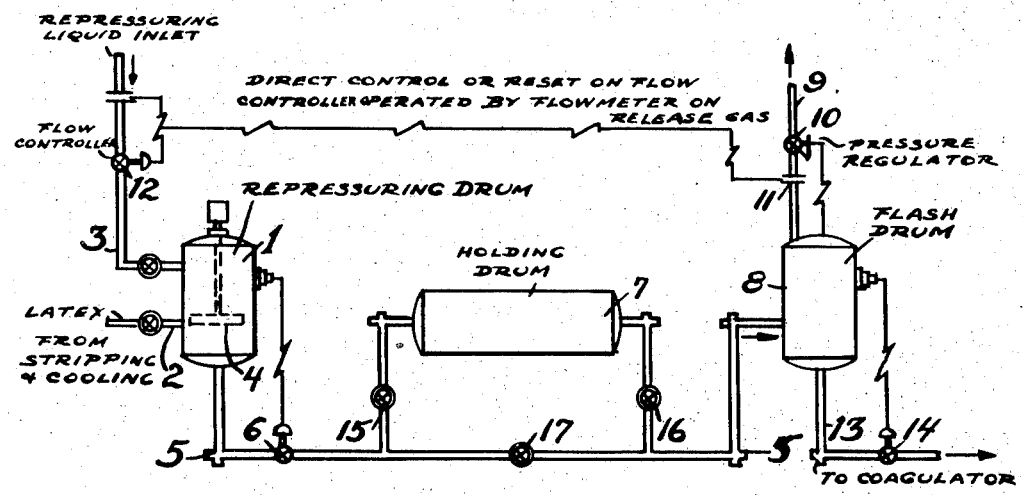
FIG.—I
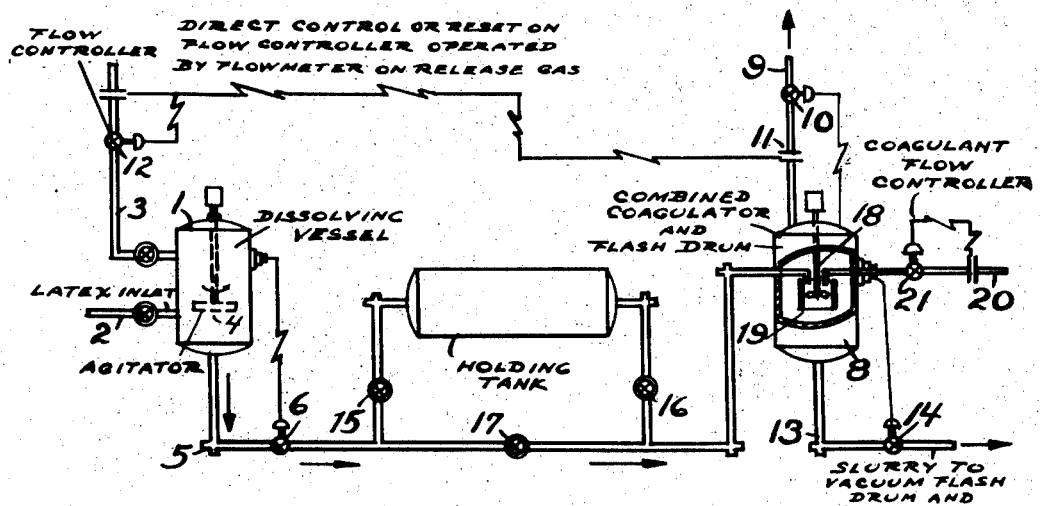
FIG.—II

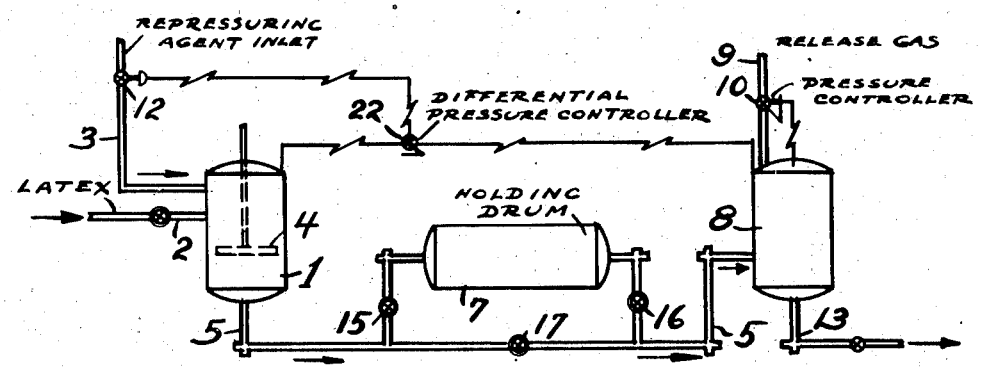
FIG.-III
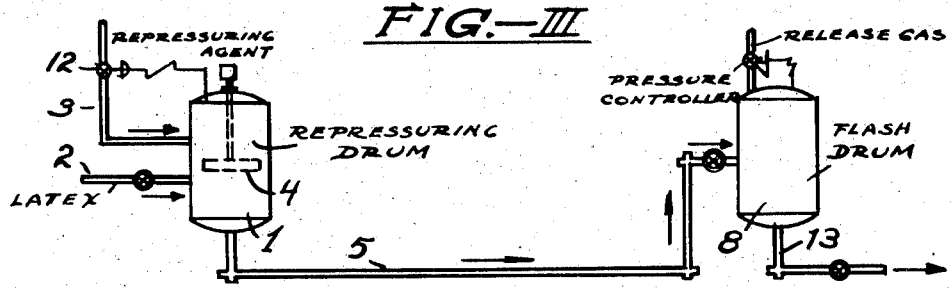
FIG.-IV
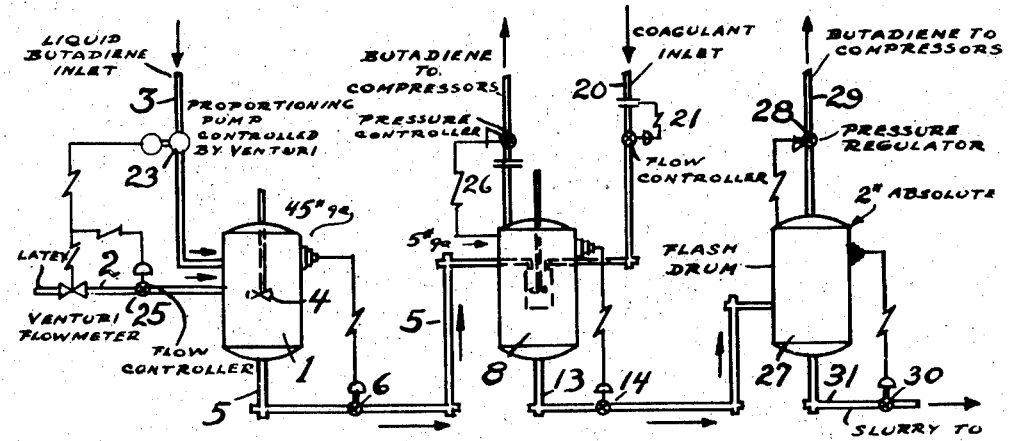
FIG.-V

2,455,714

UNITED STATES PATENT OFFICE 2,455,714

METHOD FOR THE COAGULATION OF EMULSION POLYMERIZATES

Wendell W. Waterman, Cranford, and Ernest O. Ohsol, Rahway, N. J., assignors to Standard Oil Development Company, a corporation of Delaware Application December 5, 1942, Serial No. 467,960

4 Claims. (Cl. 260—84.5)

This invention pertains to the manufacture of emulsion polymerizates and particularly to the manufacture of latices of synthetic rubber-like materials.

It is the object of the present invention to provide the art with a novel process and apparatus for the treatment of emulsion polymerizates, particularly latices of synthetic rubber-like materials.

It is a further object of the present invention to provide the art with a method and apparatus for continuously repressuring latices of synthetic rubber-like materials preparatory to coagulating the same.

It is the object of this invention to provide a method whereby a latex of a synthetic rubberlike material and a liquid repressuring agent are continuously proportioned in a zone in which solution may take place at a pressure which is higher than that at which coagulation occurs.

It is also the object of this invention to provide a method whereby latices of synthetic rubberlike materials and liquid repressuring agents are mixed under conditions of agitation and contact time such that there is rapid and sufficient solution of repressuring agent in the latex so that when the pressure is lowered, the latices will be saturated with the liquid repressuring agent at the lower pressure.

It is a further object of this invention to provide a method whereby the amount of repressuring agent dissolved in the latex entering the coagulating zone may be continuously controlled.

These and other objects will appear more clearly from the detailed description and claims which follow.

It is of course well known that synthetic rubber-like materials may be prepared from diolefins such as butadiene, isoprene, piperylene, dimethylbutadiene and the like or mixtures of such diolefins with mono-olefinic materials such as styrene and substituted styrenes, acrylic acid nitrile, methacrylic acid nitrile, acrylic and methacrylic acid esters and unsaturated ketones such as methyl vinyl ketone and the like by polymerization in aqueous emulsion. The polymerization reaction mixture is generally prepared by agitating the polymerizable materials in about double the quantity of water using a soap or other suitable emulsifying agent. The polymerization is usually effected at temperatures of about 30 to 60° C. and in the presence of a suitable polymerization catalyst which is capable of liberating oxygen under the polymerization conditions. Such catalysts include hydrogen peroxide, alkali metal and ammonium persulfates or perborates or benzoyl peroxide or the like. The polymerization is continued until about 50 to 85% of the monomeric materials are polymerized, whereupon the polymer emulsion or latex is coagulated in order to obtain the polymer in solid form.

Considerable difficulty has been encountered in finding a suitable method for coagulating such latices. When water-soluble soaps are used as emulsifier coagulation has been effected by adding sufficient acid such as acetic, formic, hydrochloric or sulfuric acids to decompose the soap or by adding an inorganic salt in sufficient amount to "salt out" the dispersed polymer. However, decomposition with acid is not satisfactory because the fatty acid from the soap remains in the coagulated polymer and can only be removed by extraction with organic solvents. Furthermore the coagulate obtained tends to agglomerate to a coherent mass which must be subjected to a mastication or attritioning treatment in order effectively to wash the polymer. Coagulation by salting out, while it may bring down relatively small particles of coagulate, does not overcome these difficulties since the soap emulsifier is also coagulated with the polymer and must be washed therefrom.

As disclosed in application Serial No. 365,012 of Vanderbilt and Beekley, filed November 9, 1940, now U. S. Patent 2,385,172, the size of the coagulated particles can be regulated by pH control. It is possible thereby to adjust this particle size so that the material can be readily filtered by means of rotary-vacuum or filter-press type filters. The particles can also be obtained sufficiently small so that the emulsifier and other water soluble materials can be nearly completely removed by simple leaching with water. Although this method of coagulating is especially applicable when using water-soluble soaps as emulsifiers, it is also advantageously used when the emulsifier consists of salts of sulfated alcohols, alkylated naphthalene sulfonates, alkyl amine salts, and the like. The coagulate thus obtained is usually separated from the salty liquor by means of a rotary suction filter and in view of the difficulties encountered in washing the resultant filter cake, it is desirable to redisperse it in water and contact it with water for about 10 to 30 minutes whereupon it is again filtered and washed with water to remove the adhering liquid, as disclosed in Serial No. 413,582, Waterman and Ohsol, filed October 4, 1941.

It has been found that when latices of synthetic rubber-like materials having Williams plasticities less than about 175-75 are coagulated by means of inorganic salts to form small particles suitable for filtering and washing, the particles are sufficiently sticky or tacky that they adhere together on standing or filtering. Since it is highly desirable if not absolutely essential to prepare latices of synthetic rubber-like materials of a Williams plasticity 160-30 or even lower in order that they may be satisfactorily compounded and processed in subsequent operations, it was found impossible to coagulate such latices and to filter and wash the coagulate with the conventional type equipment.

As disclosed in application Serial No. 407,476, filed August 19, 1941, now U. S. Patent 2,393,348 by Waterman and Vanderbilt, it has been found that if the coagulation of latices of synthetic rubber-like materials having Williams plasticities of less than 175-75 is conducted in the presence of a small, somewhat critical, proportion of low boiling hydrocarbon, such as butadiene or the like, a much smaller amount of coagulant is required and the coagulate is thrown down in a much more granular and less sticky form than is obtained in the absence of the hydrocarbon. Also, the coagulate may be obtained in relatively uniform particles, of any desired size, which are particularly easy to wash free from catalyst, emulsifier, coagulant and other water-soluble impurities. By this process, latices of synthetic rubber-like materials having a Williams plasticity as low as 50-0 can be coagulated, filtered, reslurried in water and again filtered without the coagulated particles adhering together. While the latex upon completion of the polymerization contains some unreacted butadiene, this can not ordinarily be retained until the coagulation step because of the necessity of stripping unreacted monoolefinic materials such as acrylonitrile and the like from the latex. Since this stripping operation removes all of the unpolymerized butadiene or other diolefin, it is necessary to repressure the latex by the addition of fresh diolefin or other low boiling hydrocarbon.

The present invention is an improvement of the foregoing process in as much as it permits the repressuring of latices to be carried out in a continuous manner. It is, of course, highly desirable to conduct these operations continuously not only in order to obtain a greater production volume but also to obtain a more uniform product through the maintenance of constant conditions at each processing zone. It is generally characteristic of continuous operation of this type that considerably less supervision is necessary than is required in batch operations of equal volume. Also, by maintaining continuous flow of slurry through the equipment, less chance is given for the polymer to settle out and plug lines, valves or pumps. Also, the formation of deposits in the vessels themselves due to alternate wetting and drying of the surfaces as is unavoidable in batch operation are avoided in the continuous process of the present invention.

Apparatus suitable for the conduct of the process in accordance with the present invention is illustrated diagrammatically in the accompanying drawing. In the drawing, Figure I shows an apparatus for continuously repressuring latices wherein the repressured latex is passed through a separate flash drum and the flow of repressuring agent into the repressuring drum is controlled by the flow of release gas from the flash drum.

Figure II is a similar apparatus but in which in lieu of a separate flash drum the coagulator is used as a combined coagulator and flash drum.

Figure III is an arrangement similar to Figure I but wherein the rate of repressuring agent supply is controlled by the difference in pressure between the repressuring drum and the flash drum.

Figure IV is a further modification wherein the flow of repressuring agent into the repressuring drum is controlled by the pressure in this drum.

Figure V shows an arrangement wherein a proportioning pump is used to supply repressuring liquid at a rate controlled by the latex supply.

In the several figures of the drawing 1 is the repressuring vessel wherein the repressuring agent is dissolved in the latex and 2 is the line for supplying stripped latex. 3 is the line for supplying low boiling hydrocrabon repressuring agent to the repressuring vessel and 4 is an agitator for mixing or emulsifying the added hydrocarbon in the latex. The latex is discharged from the dissolving vessel through line 5 and valve 6 which is controlled by the liquid level in vessel 1. The pressure in vessel 1 is equal to or greater than the vapor pressure of the repressuring hydrocarbon supplied through 3. The latex discharged through valve 6 is passed into the holding tank 7 and thence into vessel 8 wherein the pressure is allowed to fall to the desired value prior to discharge to a suitable coagulating vessel. The hydrocarbon released in vessel 8 in discharged through line 9 and a suitable pressure controller such as a spring loaded back pressure valve 10.

It is preferred that the amount of excess repressuring agent released through valve 10 be utilized to control automatically the amount of liquid repressuring agent supplied to vessel 1. This can be accomplished by providing an orifice or flow meter 11 on release line 9 the pressure drop across which operates to reset a flow controller 12 on the liquid repressuring agent supply line 3 in such a way that an increased flow of gas causes a decreased flow of liquid and a decreased flow of gas causes an increased flow of liquid repressuring agent. The vented repressuring agent is passed to a recovery system wherein it is reconditioned for reuse in the process. If the agitation and holdup time in repressuring drum is sufficient to establish the desired degree of solution, holding drum 7 may be omitted, or by-passed by closing valves 15 and 16 and opening valve 17.

The vented latex is discharged from vessel 8 through line 13 and valve 14 which is controlled by the liquid level in vessel 8. The repressured latex discharged through line 13 is then ready for coagulation, washing and drying in any suitable equipment.

The arrangement shown in Figure II is essentially the same as that of Figure I except that the flash drum 8 is made to serve the dual function of flash drum and coagulator by providing the same with a mechanically driven agitator 18 arranged in a draft tube 19. A line 20 provided with a flow controller 21 supplies brine to the vessel 8. As shown, the brine and the latex supply pipes discharge into the draft tube or at a point of maximum agitation. In this arrangement also, the flow of released repressuring agent through a flow meter 11 a release line 9 is utilized to control the flow of repressuring agent to the repressuring drum.

Figure III shows an arrangement wherein the rate of butadiene supply to the repressuring drum is controlled by the difference in pressure between the repressuring drum and the flash drum. In this figure a differential pressure controller 22 is connected to the repressuring drum 1 and the flash drum 8. Since the pressure in flash drum 8 is maintained substantially constant by the pressure controller on the release line 9, the differential pressure controller 22 is essentially actuated by variations in pressure in repressuring drum 1, a drop in the pressure differential actuating the controller 22 so that an increase of flow of repressuring agent to drum 1 is permitted while an increase in the pressure differential causes a decrease in the flow of repressuring agent.

In Figure IV the rate of butadiene supply to the repressuring drum is controlled by the pressure in drum 1, an increase in the pressure causing a reduction in the supply of repressuring agent and vice versa.

In Figure V, a proportioning pump 23 is provided in the repressuring agent supply line 3. A Venturi meter or the like 24 is provided in the latex supply line 2 and the rate of flow of latex through the flow meter 24 is utilized to control the operation of the proportioning pump 23. The ratio between repressuring agent and latex is manually adjusted on the basis of the amount of release gas indicated by the flow meter 26.

The coagulant solution is supplied to the drum 8 through line 20 and flow controller 21. As described above, the coagulator is preferably provided with a draft tube and propeller in order to obtain complete contact of the latex with the coagulant solution. The control setting of the rate of coagulant solution flow could be adjusted automatically, if desired by a reset operated by a flow meter on the latex supply line, or by the use of another proportioning pump.

The coagulated slurry is discharged from drum 8 through liquid level control valve 14 and is passed into a release drum 27 which is maintained under a vacuum in order to flash off and permit recovery of the butadiene or other repressuring agent in the coagulated slurry. The release drum is operated at as low a pressure as is economical to use, based on the value of the material to be recovered or safety hazzards involved. A pressure of about 2# absolute has been found to be quite suitable. The flashed off repressuring agent is withdrawn through pressure regulator 28 on line 29 and is passed to suitable compressors for reconditioning the same for reuse in the process. The stripped latex is discharged from the release drum through liquid level controlled valve 30 and passes to suitable filtering, washing and drying equipment.

In view of the tendency for the latex or the coagulated slurry to adhere to the surfaces with which it comes into contact, it is highly desirable to utilize valves of a special or "streamlined" design in all lines through which the latex or coagulate passes. In such valves, the spindle lifts clear of the throat and the liquid enters at right angles to the axis of the valve.

A typical operation of our process and apparatus is as follows:

An emulsion polymerizate is prepared by emulsifying a mixture of 75 parts butadiene and 25 parts of acrylonitrile in about 200 parts of water using about 6 parts of sodium oleate as emulsifier and polymerizing in the presence of about 0.1 to about 8 parts of ammonium persulfate and about 3 to 5 parts of a modifying agent such as dodecyl mercaptan at about 30° C. for about 12 hours. Upon completion of the polymerization and preferably after the addition of a stabilizer such as phenyl-B-napthylamine, the latex is stripped of unreacted polymerizable material by flashing off butadiene and subjecting the latex to vacuum distillation if desired with steam in order to remove unreacted acrylonitrile. The resultant stripped and stabilized latex is cooled and introduced into the dissolving vessel 1 at about 35° C. and at a rate of about 20 gallons per minute. Liquid butadiene is supplied through line 3 at about 0.5 gallon per minute and the mixture is suitably agitated so that the liquid butadiene is substantially completely emulsified in the latex. The pressure maintained in vessel 1 is at least about 43 lbs./sq. in. gauge, i. e., equal to or greater than the vapor pressure of the butadiene or other repressuring agent. The latex containing an excess of repressuring agent emulsified therein is discharged through line 5 and liquid level-controlled valve 6 into holding tank 7 in which the latex is retained for a time sufficient for enough of the repressuring agent to dissolve in the aqueous and non-aqueous phases of the latex so that when the pressure is allowed to fall to the desired value in vessel 8, the vapor phase will be in equilibrium with the liquid with respect to the quantity of repressuring agent in solution. The rate of establishment of this degree of solution, depending upon the efficiency of emulsification in vessel 1, may be sufficiently rapid that the holding tank 7 may be omitted. In this case the valves 15 and 16 are closed and valve 17 is opened permitting the latex to pass directly from vessel 1 to vessel 8.

The pressure in vessel 8 is about 5 lbs./sq. in., i. e. substantially below the vapor pressure of butadiene under the temperature prevailing therein, the pressure being that found to be in equilibrium with the latex containing the desired amount of dissolved butadiene. A greater or less pressure may be maintained, depending upon whether more or less butadiene is desired in the latex. Greater amounts of butadiene cause the formation of more granular, finer coagulates, while smaller amounts cause the formation of more tacky coagulates of larger particle size. The excess butadiene vaporized in vessel 8 escapes through the pressure control valve 18 and preferably flows through an orifice which measures the flow of rejected butadiene, and can be used as a basis for adjusting the rate of liquid butadiene addition to vessel 1. The repressured latex is discharged from the vessel 8 and may thereupon be continuously coagulated with brine or other suitable coagulant.

The latices that are repressured in accordance with the instant invention usually contain from about 0.5 to about 5% of repressuring agent and are capable of being coagulated with smaller amounts of coagulant and yield a coagulate that is less tacky and more granular in nature and may therefore be easily washed completely free of soluble contaminants.

While butadiene has been mentioned above and is in fact the preferred repressuring agent, it is to be understood that other low boiling hydrocarbons such as propane, propylene, isobutylene, normal butylenes, isoprene and the like may be employed.

Our invention is applicable to the treatment of emulsion polymerizates of diolefins or mixtures of diolefins such as butadiene, isoprene, piperylene and dimethylbutadiene as well as mixtures of diolefins with copolymerizable compounds containing a single C=C linkage such as acrylic acid nitrile, methacrylic acid nitrile, styrene, substituted styrenes, acrylic and methacrylic acid esters and methyl vinyl ketone.

What we claim and desire to secure by Letters Patent is:

1. The process which comprises continuously combining a latex, obtained by the polymerization in aqueous emulsion of a reaction mixture of butadiene and acrylonitrile and which has been substantially freed from monomers, with an excess of butadiene as repressuring agent, mixing the latex and repressuring agent under a pressure at least equal to the vapor pressure of said repressuring agent to effect sufficient solution of the repressuring agent in the aqueous and non-aqueous phases of the latex to render the latex substantially saturated with repressuring agent at the lower pressure next applied, continuously discharging the treated latex into a flashing zone of lower pressure, venting off the liberated excess repressuring agent, controlling the rate of admission of the repressuring agent so as to maintain a substantially constant differential pressure between the mixing zone and the flashing zone, maintaining a substantially constant pressure in the flashing zone by regulating the rate at which the liberated excess repressuring agent is vented off and continuously adding coagulant brine to the treated latex while the latex contains from about 0.5 to 5% of repressuring agent.

2. The process which comprises continuously combining a latex, obtained by the polymerization in aqueous emulsion of a reaction mixture of butadiene and acrylonitrile and which has been substantially freed from monomers, with an excess of butadiene as repressuring agent, mixing the latex and repressuring agent under a pressure at least equal to the vapor pressure of said repressuring agent to effect sufficient solution of the repressuring agent in the aqueous and non-aqueous phases of the latex to render the latex substantially saturated with repressuring agent at the lower pressure next applied, continuously discharging the treated latex into a flashing zone of a lower pressure, venting off the liberated excess repressuring agent, controlling the rate of admission of the repressuring agent so as to maintain a substantially constant pressure in the mixing zone, independently maintaining a substantially constant pressure in the flashing zone by regulating the rate at which the liberated excess repressuring agent is vented off and continuously adding coagulant brine to the treated latex while the latex contains from about 0.5 to 5% of repressuring agent.

3. In a method for coagulating latices obtained by the copolymerization in aqueous emulsion of a conjugated diolefin of from 4 to 6 carbon atoms per molecule, and an unsaturated comonomer containing a single $CH_2=C$ group, which latices have been substantially freed of unreacted monomers, the steps which comprise continuously combining said latices with an excess of butadiene as repressuring agent, mixing the latices and repressuring agent under a pressure at least equal to the vapor pressure of said repressuring agent to effect sufficient solution of repressuring agent in the aqueous and non-aqueous phases of the latex to render the latex substantially saturated with repressuring agent at the lower pressure next applied, continuously discharging the treated latex into a zone of lower pressure, continuously venting off repressuring agent released from said latices thereby reducing the repressuring agent content of the latex to from 0.5 to 5% and coagulating the latex containing said amounts of repressuring agent by adding coagulant brine thereto.

4. In a method for coagulating latices obtained by the copolymerization in aqueous emulsion of a major proportion of a butadiene-1,3 and a minor proportion of acrylonitrile, which latices have been substantially freed of unreacted monomers, the steps which comprise continuously combining said latices with an excess of butadiene as repressuring agent, mixing the latices and repressuring agent under a pressure at least equal to the vapor pressure of said repressuring agent to effect sufficient solution of repressuring agent in the aqueous and non-aqueous phases of the latex to render the latex substantially saturated with repressuring agent at the lower pressure next applied, continuously discharging the treated latex into a zone of lower pressure, continuously venting off repressuring agent released from said latices thereby reducing the repressuring agent content of the latex to from 0.5 to 5% and coagulating the latex containing said amounts of repressuring agent by adding coagulant brine thereto.

WENDELL W. WATERMAN.
ERNEST O. OHSOL.

REFERENCES CITED

The following references are of record in the file of this patent:

UNITED STATES PATENTS

| Number | Name | Date |
|---|---|---|
| 2,085,524 | De Simo | June 29, 1937 |
| 2,229,661 | Mann | Jan. 28, 1941 |
| 2,269,421 | Arveson | Jan. 13, 1942 |
| 2,393,348 | Waterman | Jan. 22, 1946 |

FOREIGN PATENTS

| Number | Country | Date |
|---|---|---|
| 304,207 | Great Britain | Apr. 15, 1930 |
| 312,201 | Great Britain | May 21, 1929 |